(12) United States Patent
Someya et al.

(10) Patent No.: US 6,392,656 B1
(45) Date of Patent: May 21, 2002

(54) FIELD-SEQUENTIAL COLOR IMAGE DISPLAY APPARATUS AND METHOD WITH REDUCED COLOR BREAKUP

(75) Inventors: Jun Someya; Shinsuke Shikama, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/314,143

(22) Filed: May 19, 1999

(30) Foreign Application Priority Data

May 20, 1998 (JP) .............................. 10-138500

(51) Int. Cl.[7] ................................................ G09G 5/06
(52) U.S. Cl. .................... 345/589; 315/600; 315/604; 315/690
(58) Field of Search ................................ 345/150, 151, 345/152, 153, 589, 591, 592, 593, 597, 600, 603, 604, 605, 549, 690, 3.2, 22, 72, 83, 88, 89; 348/268, 269, 263, 34, 223, 742, 743; 353/31

(56) References Cited

U.S. PATENT DOCUMENTS

| | | | | |
|---|---|---|---|---|
| 4,322,740 A | * | 3/1982 | Takemoto et al. | 348/264 |
| 5,135,300 A | * | 8/1992 | Toide et al. | 353/31 |
| 6,034,666 A | * | 3/2000 | Kanai et al. | 345/150 |
| 6,115,152 A | * | 9/2000 | Popovich et al. | 359/15 |

\* cited by examiner

*Primary Examiner*—Jeffery Brier
*Assistant Examiner*—Thu-Thao Havan

(57) ABSTRACT

A field-sequential color image display device receives red, green, and blue image data, and decomposes the received data into more than three monochromatic images. The monochromatic images may include at least two red, two green, and two blue images. Alternatively, the monochromatic images may include one white image and at least one red, one green, and one blue image. The monochromatic images are displayed sequentially, each monochromatic image followed by another monochromatic image of a different color. The increased number of monochromatic images alleviates the problem of color breakup.

22 Claims, 15 Drawing Sheets

FIELD-SEQUENTIAL COLOR IMAGE DISPLAY APPARATUS AND METHOD WITH REDUCED COLOR BREAKUP

BACKGROUND OF THE INVENTION

The present invention relates to a field-sequential color image display apparatus and method with improved picture quality.

Field-sequential color is used in, for example, projection television systems, data projectors, head-mounted displays, monitors, and viewfinders, where it enables high-resolution color images to be displayed with comparatively few monochromatic picture elements. In conventional field-sequential color image display apparatus, red, green, and blue monochromatic images are displayed in the sequence shown in FIG. 18, in which R1 and R2 are red, G1 and G2 are green, and B1 and B2 are blue. R1, G1, and B1 together constitute one field, if interlaced scanning is used, or one frame, if progressive scanning is used, and R2, G2, and B2 constitute the next field or frame. The image display rate is three times the field rate or frame rate. The eye perceives the separate red, green, and blue images as a combined full-color image. In known field-sequential color image display apparatus, the monochromatic images are generated as gray-scale images and are colorized by means of, for example, a rotating filter wheel, color switches utilizing birefringent materials, or red, green, and blue light sources such as light-emitting diodes that are switched on and off sequentially.

The red, green, and blue monochromatic images are technically referred to as red, green, and blue fields, as implied by the name 'field-sequential color,' but the term 'monochromatic image' will be used herein instead of 'field,' to avoid confusion with the fields in interlaced scanning.

A problem encountered in conventional field-sequential color image display apparatus is that the individual primary colors (red, green, blue) are perceived separately at the edges of moving objects. This problem, referred to as color breakup, is particularly obvious when the primary colors are combined to produce a black-and-white image. Color breakup also occurs in still images, when the viewer's eye scans across the display.

SUMMARY OF THE INVENTION

An object of the present invention is to reduce color breakup in a field-sequential color image display.

The invented method of displaying a color image comprises the steps of:

receiving image data for the red, green, and blue components of one full-color image;

decomposing the image data to generate more than three monochromatic images, including at least one red monochromatic image, at least one green monochromatic image, and at least one blue monochromatic image; and displaying the monochromatic images sequentially.

In one aspect of the invention, the monochromatic images include N red monochromatic images, N green monochromatic images, and N blue monochromatic images, where N is an integer greater than one. Each monochromatic image is displayed following a monochromatic image of a different color.

In another aspect of the invention, the monochromatic images include one white monochromatic image, as well as at least one red, one green, and one blue monochromatic image. The terms 'white monochromatic image' and 'white image' are used herein to mean an image including white, black, and shades of gray.

Both aspects of the invention reduce color breakup by shortening the intervals at which monochromatic images of different colors are displayed. In the second aspect of the invention, the white monochromatic image is completely free of color breakup.

DETAILED DESCRIPTION OF THE INVENTION

Figure 1:
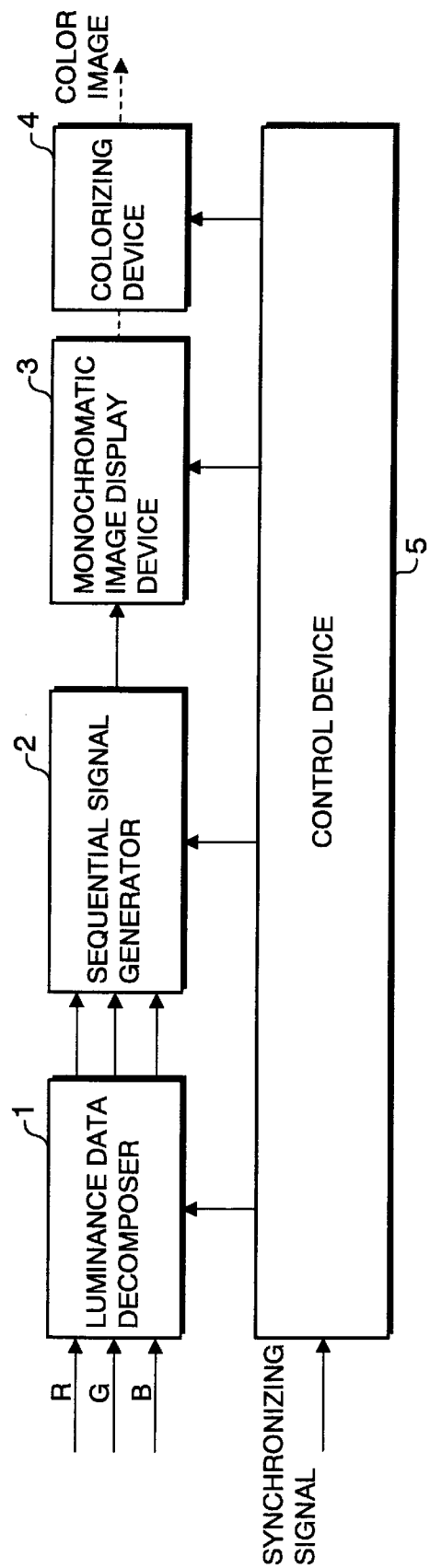
FIG. 1 shows a field-sequential color image display apparatus in a first embodiment of the invention.

Embodiments of the invention will be described with reference to the attached drawings, in which like parts are indicated by like reference characters. As the embodiments are compatible with both interlaced and progressive scanning systems, the collection of images representing different color components at the same instant in time will be referred to as a 'field or frame.'

Referring to FIG. 1 the first embodiment is a field-sequential color image display apparatus comprising a luminance data decomposer 1, a sequential signal generator 2, a monochromatic image display device 3, a colorizing device 4, and a control device 5. R, G, and B denote red, green, and blue image data, which are received by the luminance data decomposer 1. The red, green, and blue input images are synchronized with a synchronizing signal, which is received by the control device 5.

Figure 2:
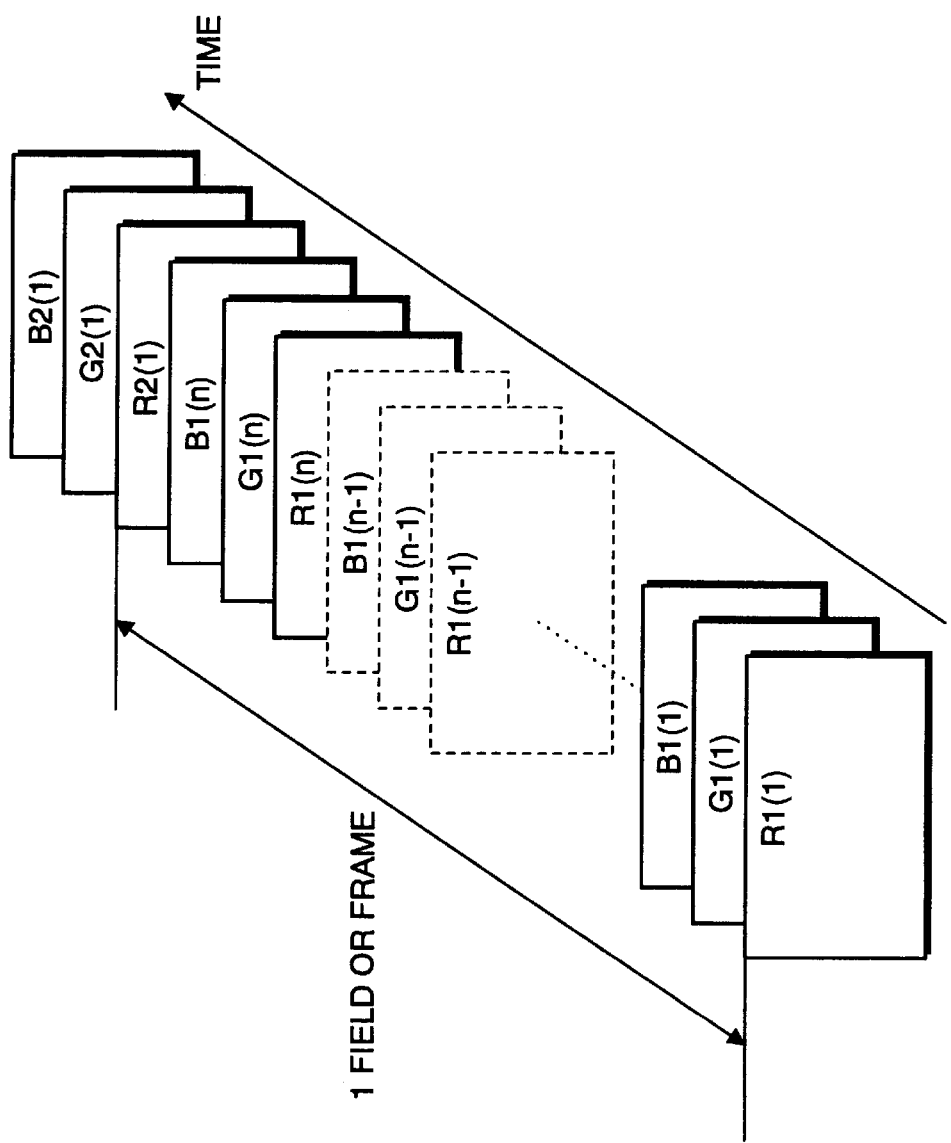
FIG. 2 illustrates the sequence of monochromatic images displayed in the first embodiment.

The overall operation of the first embodiment is illustrated in FIG. 2. The first embodiment displays n monochromatic images per field or frame in each of the three primary colors, red, green, and blue, where n is a fixed integer not less than two. In the first field or frame, the red monochromatic images are numbered from R1(1) to R1(n), the green monochromatic images from G1(1) to G1(n), and the blue monochromatic images from B1(1) to B1(n). Monochromatic image R1(1) is displayed first, followed by G1(1), B1(1), R1(2), and so on, cycling among red, green, and blue. Following B1(n), the first red monochromatic image R2(1) of the next field or frame is displayed.

The data for these monochromatic images are obtained by the luminance data decomposer 1 by decomposing the input image data R, G, and B. The resulting monochromatic images will also be referred to as decomposed images below. The decomposed monochromatic images are supplied to the sequential signal generator 2 in sequence from one to n for each primary color. The sequential signal generator 2 converts the data for each monochromatic image received from the luminance data decomposer 1 to signals suitable for driving the monochromatic image display device 3, and supplies these signals to the monochromatic image display device 3 in the order indicated in FIG. 2. The monochromatic image display device 3 displays each image as a white image. The colorizing device 4 converts each of these white images to a monochromatic image of the appropriate primary color (red, blue, or green). The control device 5 controls and synchronizes these operations according to the received synchronizing signal.

In the following description, it will be assumed that the sequential signal generator 2 generates different gray levels by driving the picture elements in the monochromatic image display device 3 for different lengths of time, a method referred to as pulse-width modulation. In this case, the luminance data decomposer 1 can generate the monochromatic images R(1) to R(n), G(1) to G(n), and B(1) to B(n) by dividing the input R, G, and B image data values by n, as indicated by the following equations, in which x varies from one to n.

$R(x)=R/n$ $G(x)=G/n$ $B(x)=B/n$

The n decomposed images of a given primary color are then identical, and the total illumination produced by each picture element in the n decomposed images is the same as in conventional field-sequential display apparatus that uses the R, G, and B data as is.

It is not necessary, however, for the luminance data decomposer 1 to operate in this way; the n decomposed images generated for each primary color may differ from one another. Three examples of decomposition schemes that produce differing monochromatic images will be shown next. In each scheme, the R, G, and B input data each comprise eight bits per picture element, and the sequential signal generator 2 employs a pulse-width-modulation driving scheme in which a picture element in the monochromatic image display device 3 is switched on or off for intervals of successively increasing length according to the values of successive data bits, from the least significant to the most significant of the eight bits. In these three examples, n is equal to two.

Figure 3:
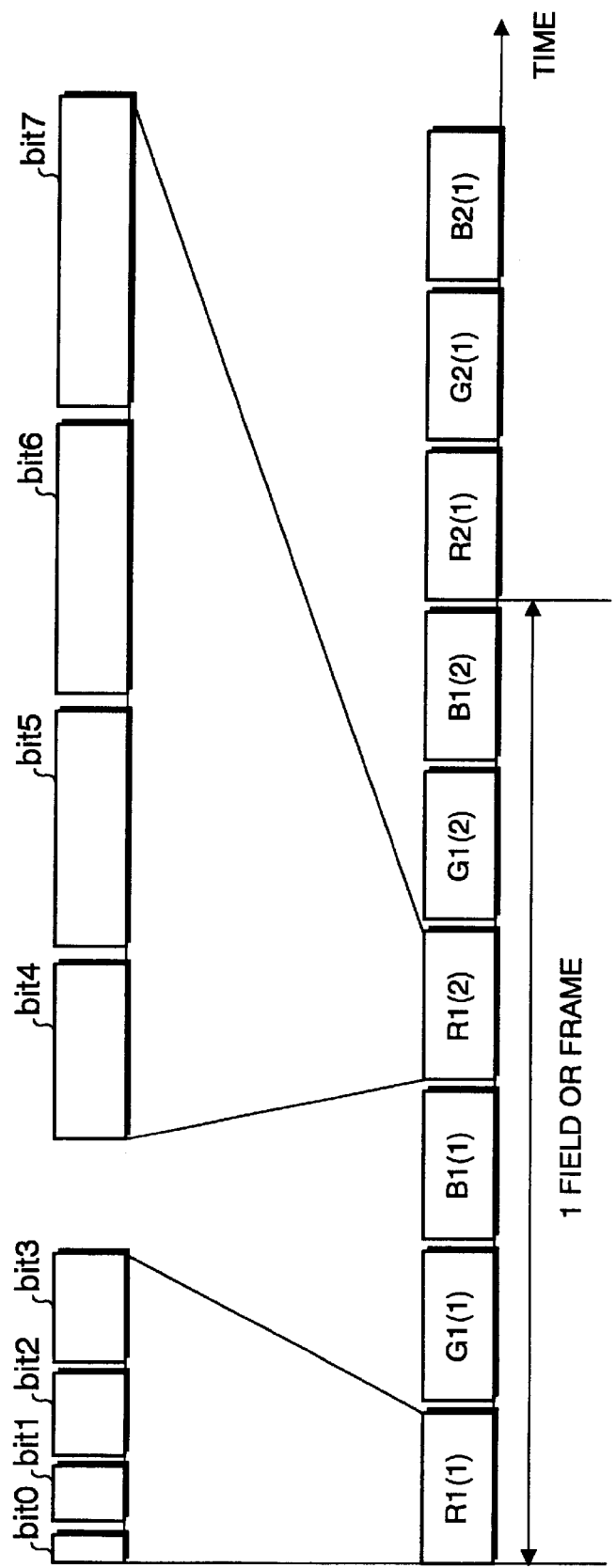
FIG. 3 shows one exemplary mode of operation of the luminance data decomposer of the first embodiment.

In the first example, shown in FIG. 3, the luminance data decomposer 1 decomposes the data for each primary color so that the four lower bits are displayed in the first decomposed image of that color in a given field or frame, and the four upper bits are displayed in the second decomposed image. As shown for red, the four lower bits (bit 0 to bit 3) control the four shortest on-off intervals, and the four upper bits (bit 4 to bit 7) control the four longest intervals. The duration of image R1(1) is thus shorter than the duration of image R1(2). The green and blue images are decomposed and displayed similarly.

Figure 4:
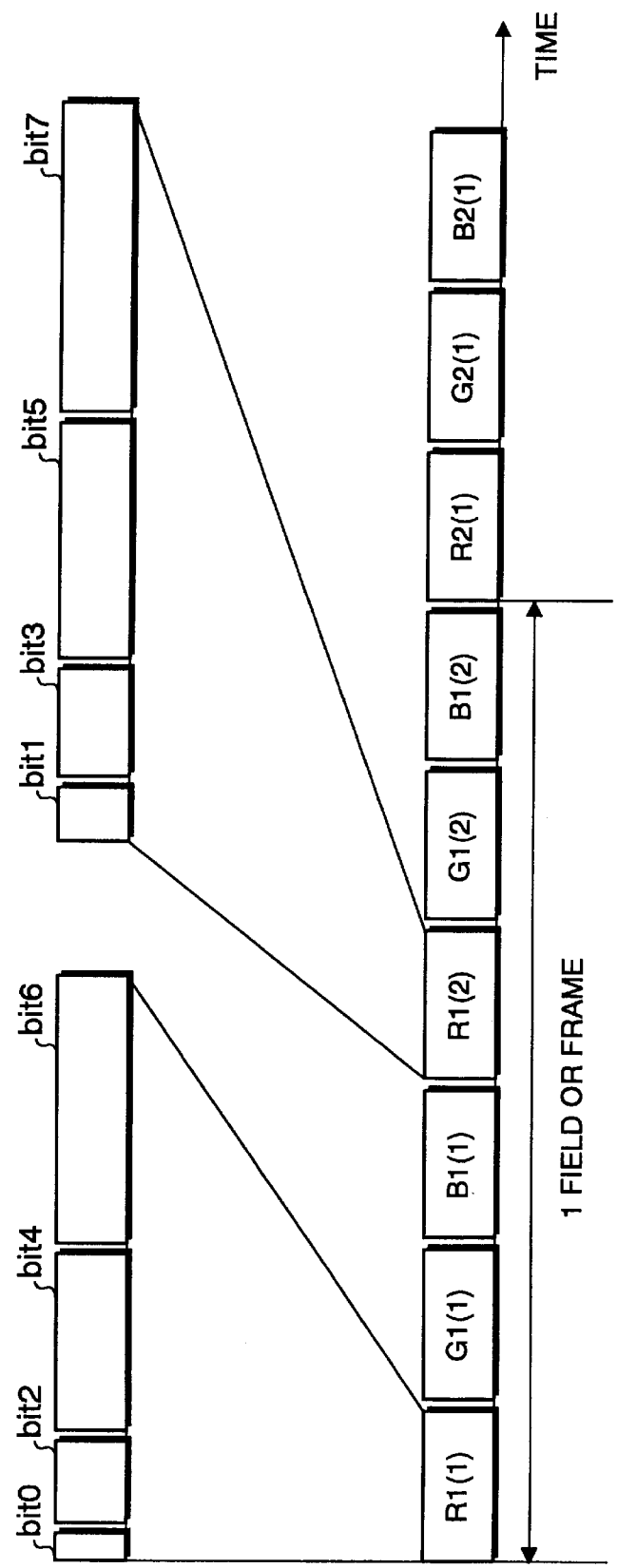
FIG. 4 shows another exemplary mode of operation of the luminance data decomposer.

In the second example, shown in FIG. 4, the even-numbered bits are displayed in the first decomposed image, and the odd-numbered bits in the second decomposed image of the same color, in each field or frame. Taking the red images in the first field or frame as an example, the even-numbered bits (bits 0, 2, 4, and 6) are displayed in image R1(1), and the odd-numbered bits (bits 1, 3, 5, and 7) in image R1(2). This scheme gives images R1(1) and R1(2) more nearly equal durations, although R1(1) is still shorter than R1(2). The green and blue images are decomposed and displayed similarly.

Figure 5:
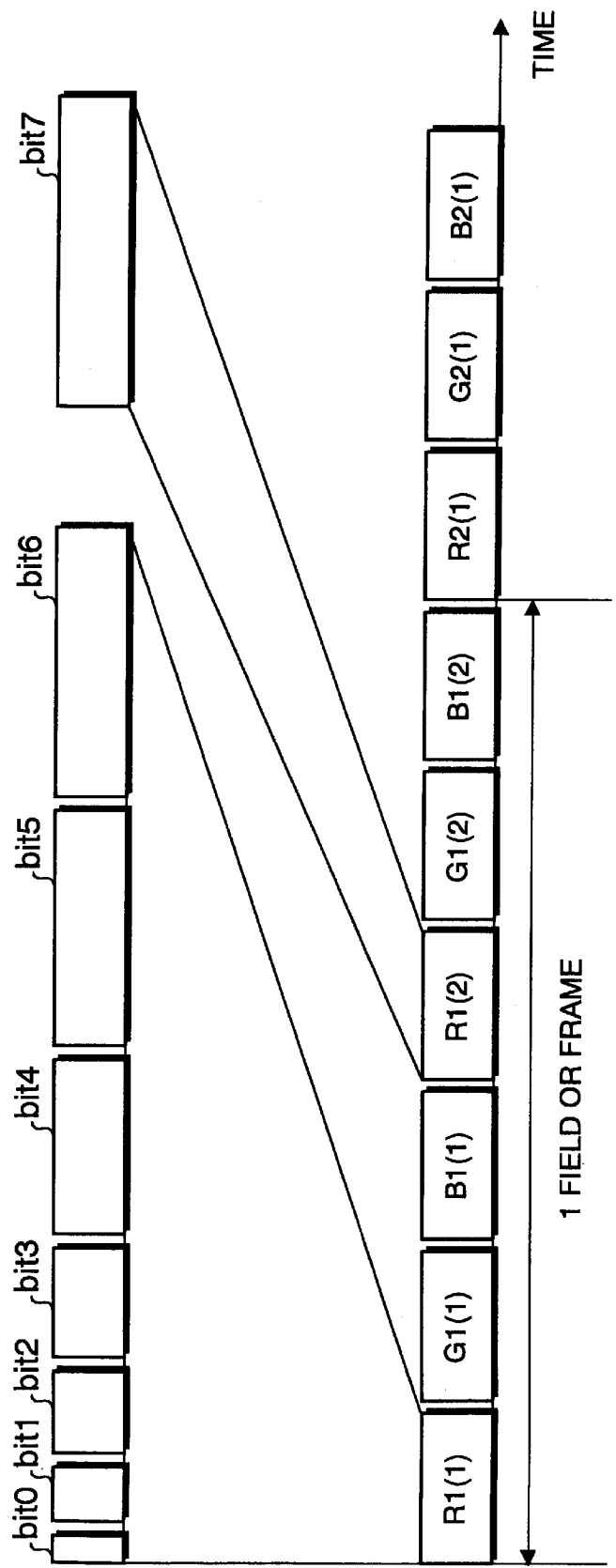
FIG. 5 shows a further exemplary mode of operation of the luminance data decomposer.

In the third example, shown in FIG. 5, the lower seven bits of the data for each color are displayed in the first decomposed image of that color, and only the most significant bit is displayed in the second decomposed image. Again taking red as an example, the seven lower bits (bits 0 to 6) are displayed in image R1(1), and the most significant bit (bit 7) is displayed in image R1(2). When the lengths of the on-off intervals form a successively doubling sequence, as in the widely-used powers-of-two pulse-width modulation scheme, the duration of image R1(1) is substantially equal to the duration of image R1(2). The green and blue decomposed images also have substantially equal durations. This substantial equality of the decomposed image durations simplifies the hardware configuration of the sequential signal generator 2 and monochromatic image display device 3.

Figure 6:
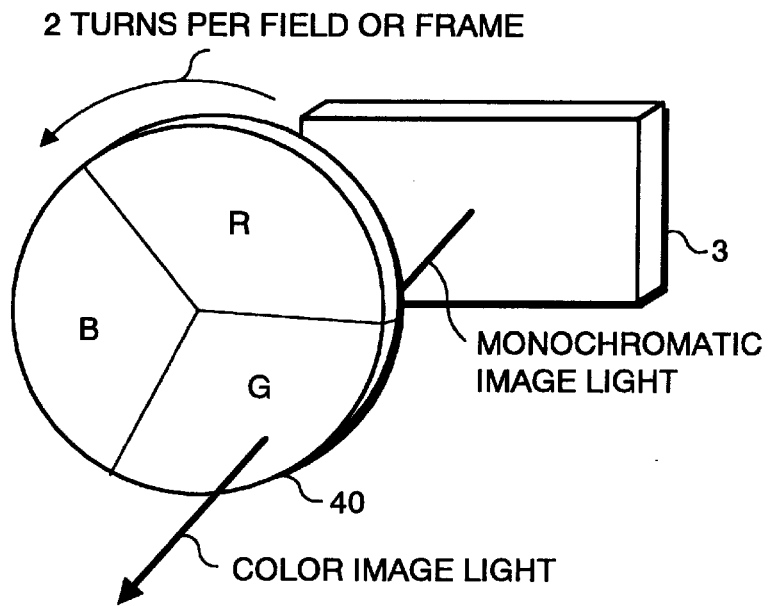
FIG. 6 shows an exemplary configuration of the colorizing device in the first embodiment.

Referring to FIG. 6, the colorizing device 4 in the first embodiment comprises, for example, a color filter wheel 40 with red (R), green (G), and blue (B) filter sectors, each subtending an angle of 120°. The color filter wheel 40 is disposed in front of the monochromatic image display device 3, and turns at a rate of two revolutions per field or frame, in synchronization with the display of the decomposed images on the monochromatic image display device 3, so that each decomposed image is converted from white light to light of the appropriate primary color. This type of color filter wheel 40 is suitable when all decomposed images have substantially the same duration.

Figure 7:
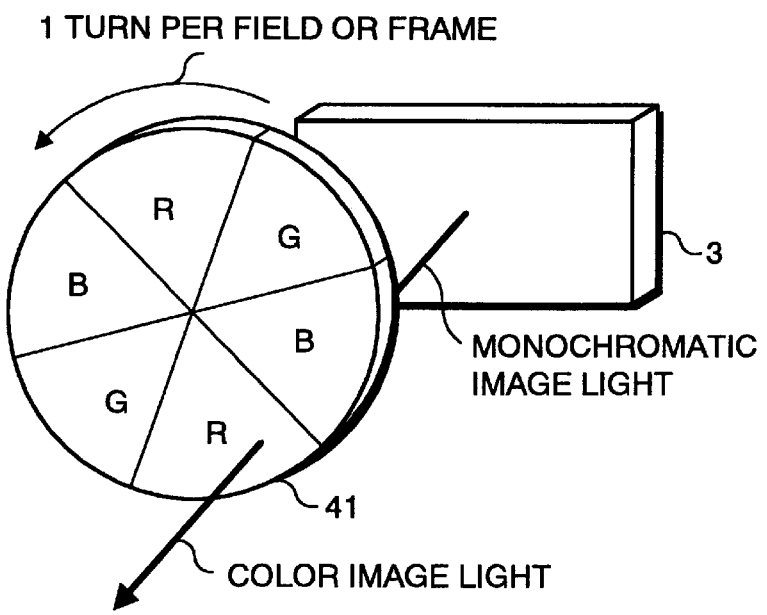
FIG. 7 shows another exemplary configuration of the colorizing device.

FIG. 7 shows a type of color filter wheel 41 that can be used when the decomposed monochromatic images do not all have the same duration. This color filter wheel 41 is divided into six sectors, in the sequence red (R), green (G), blue (B), red (R), green (G), blue (B). This color filter wheel 41 makes one revolution per field or frame, synchronized with the image display on the monochromatic image display device 3 so that each decomposed image is filtered by a sector of the appropriate color. The angle subtended by each sector is proportional to the duration of the corresponding decomposed image on the monochromatic image display device 3.

Figure 8:
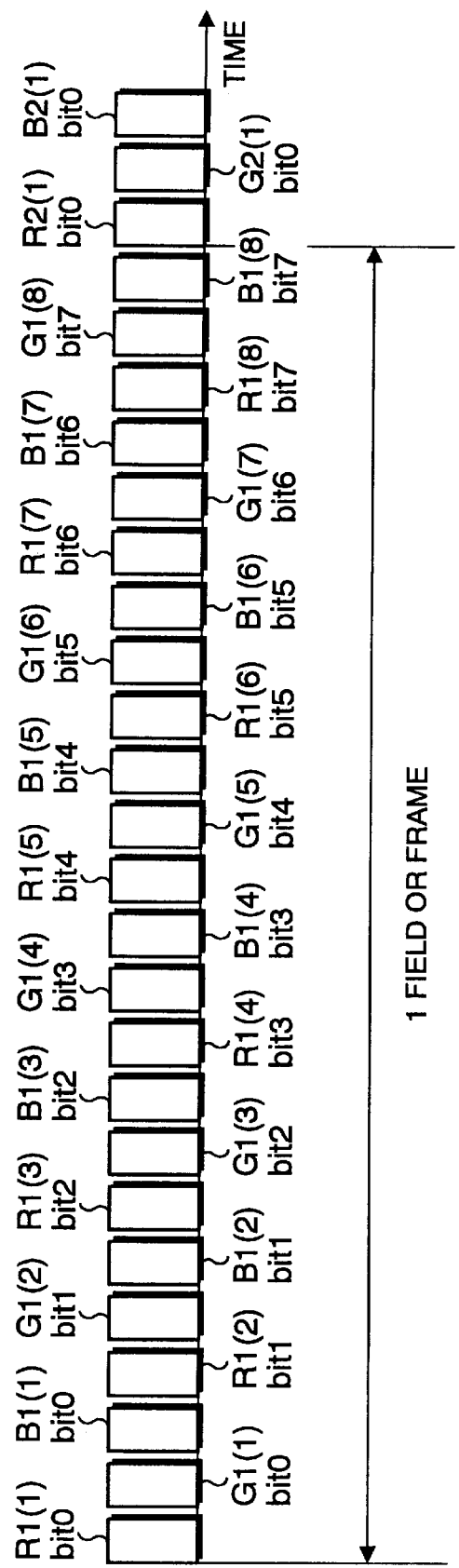
FIG. 8 shows still another exemplary mode of operation of the luminance data decomposer.

By displaying n images of each primary color in each field or frame, where n is at least two, the first embodiment reduces perceptible color breakup, because images of different colors are displayed at shorter intervals than in the conventional apparatus. The resulting improvement in image quality is generally greater for greater values of n, so if the colorizing device 4 can switch colors quickly enough, the first embodiment can be made to operate as shown in FIG. 8, displaying a separate monochromatic image in each primary color for each bit plane of the input image data. In FIG. 8, the input image data are eight-bit data, and twenty-four images are displayed per field or frame. The first three images are produced from the least significant bits of the red, green, and blue image data. The last three images are produced from the most significant bits.

FIG. 8 only indicates the sequence of the images; it does not indicate their relative durations, which may double, for example, with each successive bit from the least significant bit to the most significant bit.

The bit decomposition schemes illustrated in FIGS. 3, 4, 5, and 8 are not limited to eight-bit image data. Similar decompositions can be carried out on image data with other numbers of bits M, generating up to M monochromatic images per color per field or frame.

Successive bits do not have to represent intervals with successively doubling durations. Other ratios can be used.

The order in which the monochromatic images are displayed can also be changed. The color sequence need not be red, green, blue, and the images do not have to be displayed in ascending order of bit significance. A cyclic sequence of colors is desirable, but the basic requirement is that each displayed monochromatic image is preceded and followed by a monochromatic image of a different primary color.

Various types of monochromatic image display devices can be used, including both transmissive and reflective types. Depending on the type employed, the colorizing device 4 may be disposed behind the monochromatic image display device 3, or to one side of the monochromatic image display device 3.

Next, a second embodiment will be described. The second embodiment displays white monochromatic images as well as images of the three primary colors.

Figure 9:
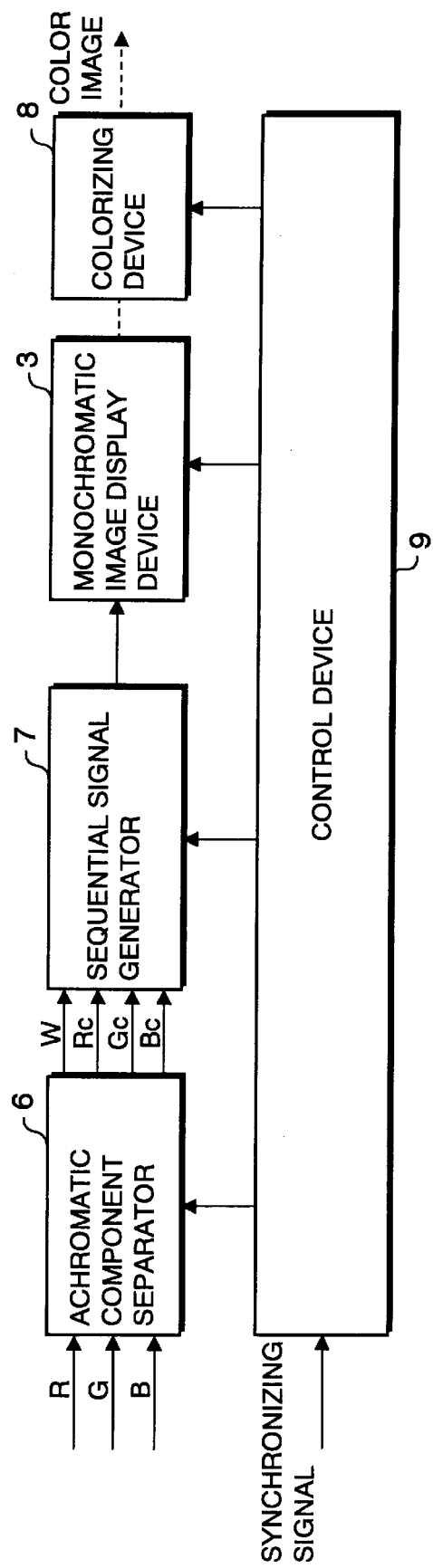
FIG. 9 shows a field-sequential color image display apparatus in a second embodiment of the invention.

Referring to FIG. 9, the second embodiment comprises the same monochromatic image display device 3 as in the first embodiment, and an achromatic component separator 6, a sequential signal generator 7, a colorizing device 8, and a control device 9. The input red, green, and blue image data are received by the achromatic component separator 6. The control device 5 receives a synchronizing signal as in the first embodiment.

The achromatic component separator 6 operates as a data decomposing means, decomposing the received R, G, and B values for each picture element into a white or achromatic component W, a remaining red chromatic component Rc, a remaining green chromatic component Gc, and a remaining blue chromatic component Bc, where at least one of the remaining chromatic components Rc, Gc, Bc is zero. These components W. Rc, Gc, Bc are supplied to the sequential signal generator 7, which generates corresponding signals to drive the monochromatic image display device 3. The colorizing device 8 converts the component images displayed by the monochromatic image display device 3, which are all white, to monochromatic images of the colors white, red, green, and blue. The control device 8 controls and synchronizes these operations according to the received synchronizing signal.

Figure 10:
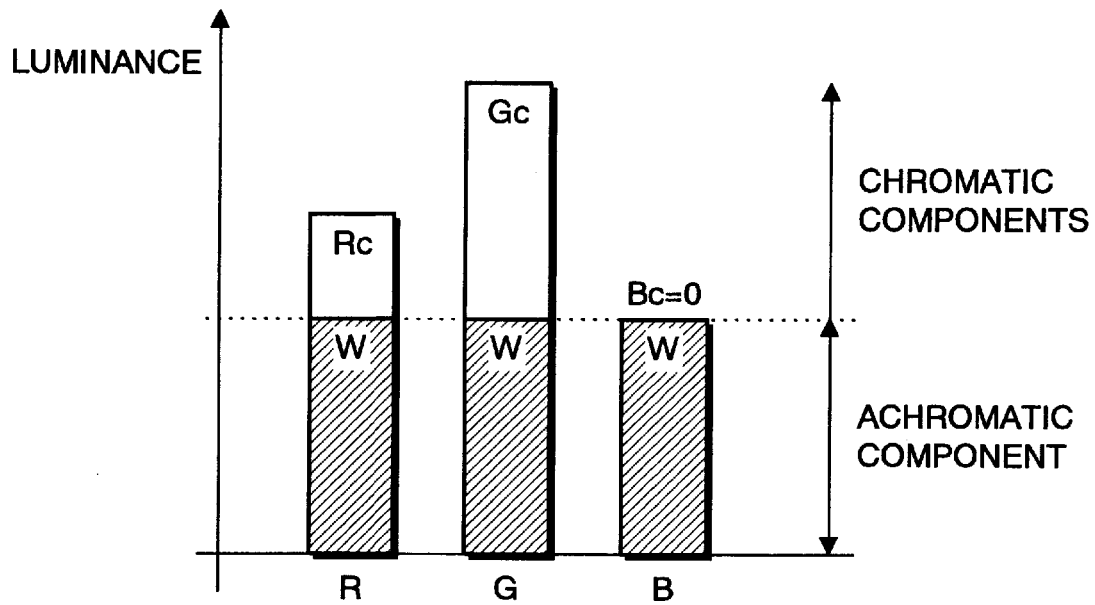
FIG. 10 illustrates the operation of the achromatic component separator in the second embodiment.

FIG. 10 illustrates the operation of the achromatic component separator 6. The vertical axis indicates the received R, G, and B data values. For each picture element, the achromatic component separator 6 finds the smallest of the three values, and uses this value as the value (W) of the picture element in the white monochromatic image. Next, the achromatic component separator 6 subtracts W from the R, G, and B values to obtain the values Rc, Gc, and Bc of the colored monochromatic images. In FIG. 10, since B is the smallest of the three primary-color values, the white component value W is equal to B, the blue component value Bc is zero, the red component value Rc is equal to the difference between R and B (R–B), and the green component value Gc is equal to the difference between G and B (G–B).

Figure 11:
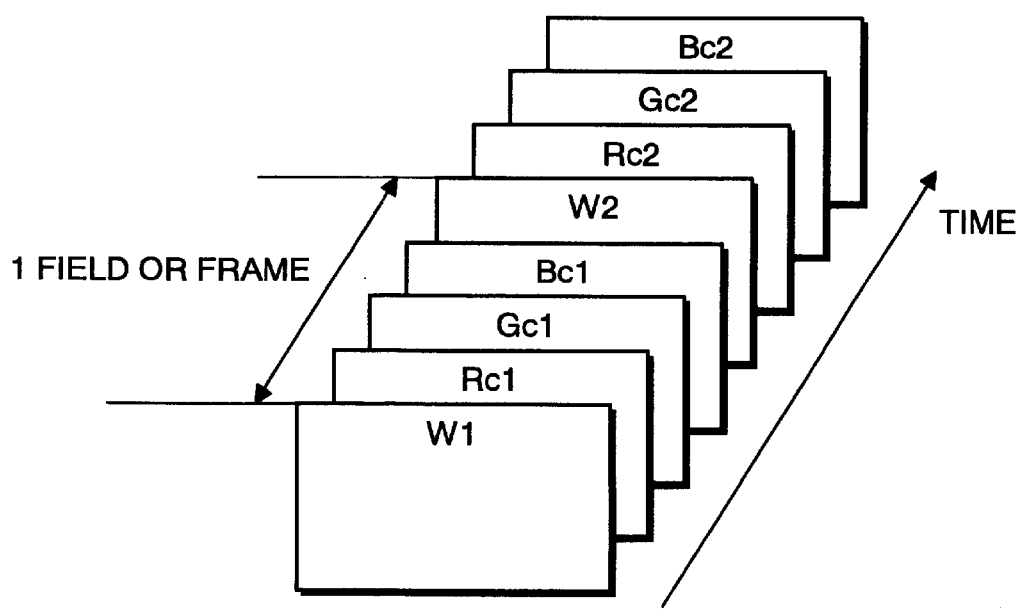
FIG. 11 illustrates the sequence of monochromatic images displayed in the second embodiment.

The overall operation of the second embodiment is illustrated in FIG. 11. The second embodiment displays four monochromatic images per field or frame in the sequence white, red, green, blue. The four images in the first field or frame are W1, Rc1, Gc1, and Bc1. The four images in the second field or frame are W2, Rc2, Gc2, and Bc2. Subsequent fields or frames are displayed similarly.

Figure 12:
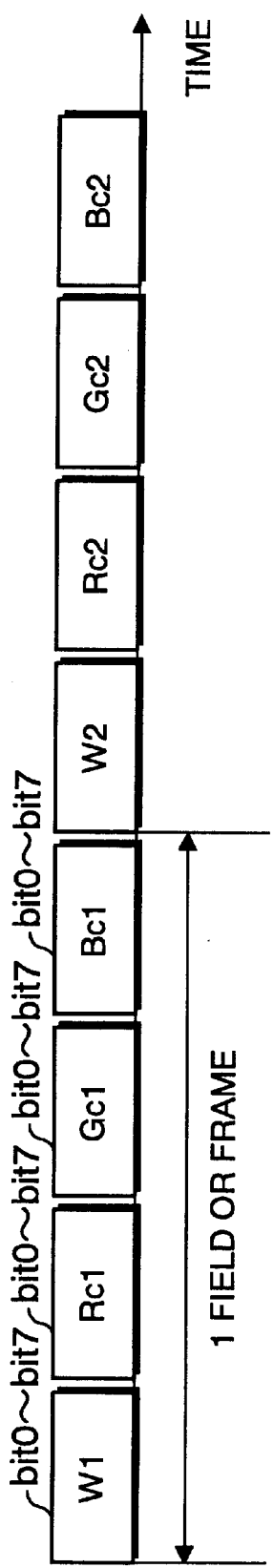
FIG. 12 illustrates the corresponding monochromatic image data sequence.

Referring to FIG. 12, the data for each of the four monochromatic images in each field or frame comprise, for example, eight bits (bits 0 to 7) per picture element. Alternatively, the data for the white monochromatic image comprise eight bits per picture element, and the data for the red, green, and blue monochromatic images comprise fewer bits per picture element. In particular, the number of bits per picture element in the blue monochromatic image can be reduced, because of the relatively low visual sensitivity of the color blue.

Figure 13:
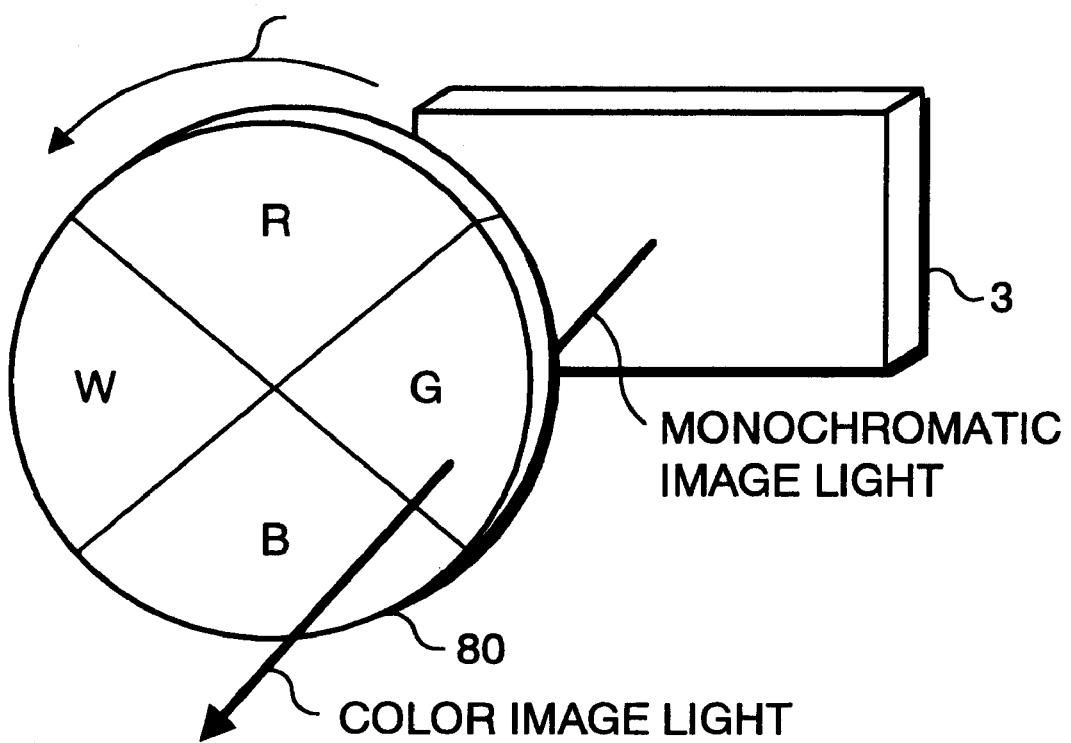
FIG. 13 shows an exemplary configuration of the colorizing device in the second embodiment.

Referring to FIG. 13, the colorizing device 8 in the second embodiment is, for example, a color filter wheel 80 divided into four equal sectors, making one revolution per field or frame. The R, G, and B sectors are filters that transmit the primary colors red, green, and blue, respectively. The W sector is a colorless sector that transmits all colors. Placed in front of the monochromatic image display device 3, this color filter wheel 80 generates a white monochromatic image, a red monochromatic image, a green monochromatic image, and a blue monochromatic image in each field or frame.

The second embodiment is particularly effective in reducing color breakup in black-and-white images, which have identical R, G, and B data values. The Rc, Gc, and Bc values all become zero, so only white monochromatic images are displayed, and color breakup is completely eliminated.

In the general case, in which the R, G, and B values of the input data are not identical, color breakup is reduced because the intervals at which the three primary-color monochromatic images are displayed in each field or frame are somewhat shortened. This is true even when no white component is displayed because one of the three primary-color components is zero. When the R, G, and B values in the input data are all greater than zero, color breakup is further reduced because the intensity of the red, green, and blue monochromatic images is reduced.

Next, a third embodiment will be described. The third embodiment combines the features of the first two embodiments.

Figure 14:
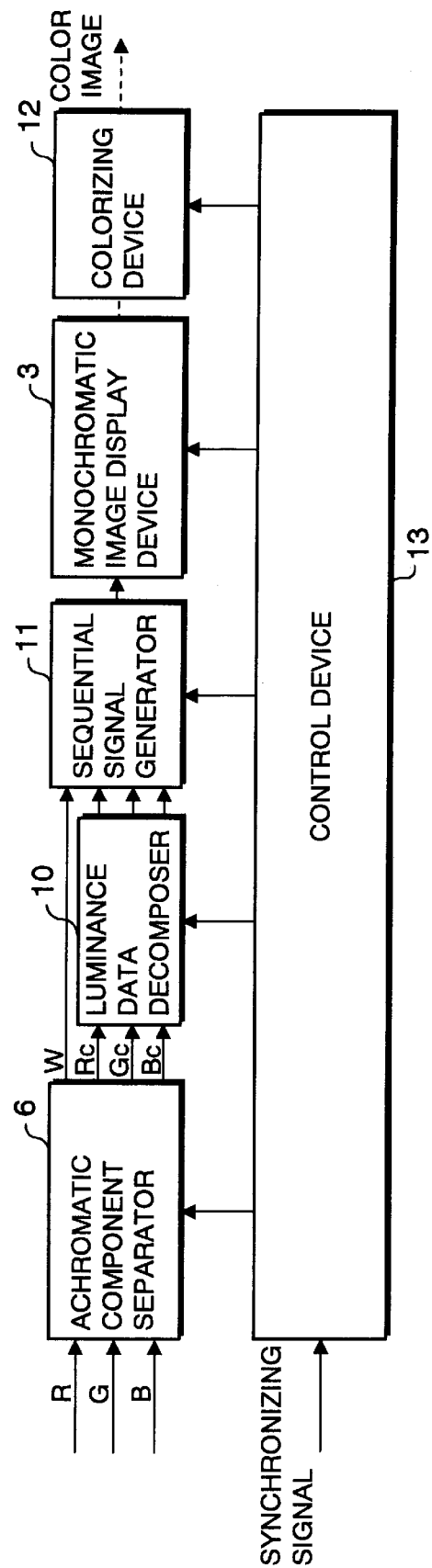
FIG. 14 shows a field-sequential color image display apparatus in a third embodiment of the invention.

Referring to FIG. 14, the third embodiment comprises the same monochromatic image display device 3 as in the first embodiment, the same achromatic component separator 6 as in the second embodiment, and a luminance data decomposer 10, a sequential signal generator 11, a colorizing device 12, and a control device 13. Input red, green, and blue image data are received by the achromatic component separator 6, while the control device 13 receives a synchronizing signal.

The achromatic component separator 6 operates as described in the second embodiment. The luminance data decomposer operates on the red (Rc), green (Gc), and blue (Bc) components output by the achromatic component separator 6 in the manner described in the first embodiment, generating n decomposed images per field or frame in each of the three primary colors. The sequential signal generator 7 receives the white monochromatic image W from the achromatic component separator 6 and n decomposed images in each primary color from the luminance data decomposer 10, and generates signals that drive the monochromatic image display device 3. The colorizing device 12 converts the red, green, and blue decomposed images, which are displayed as white images by the monochromatic image display device 3, to images of the appropriate primary colors red, green, and blue, leaving the white monochromatic image W as a white image. The control device 13 controls and synchronizes these operations according to the received synchronizing signal.

Figure 15:
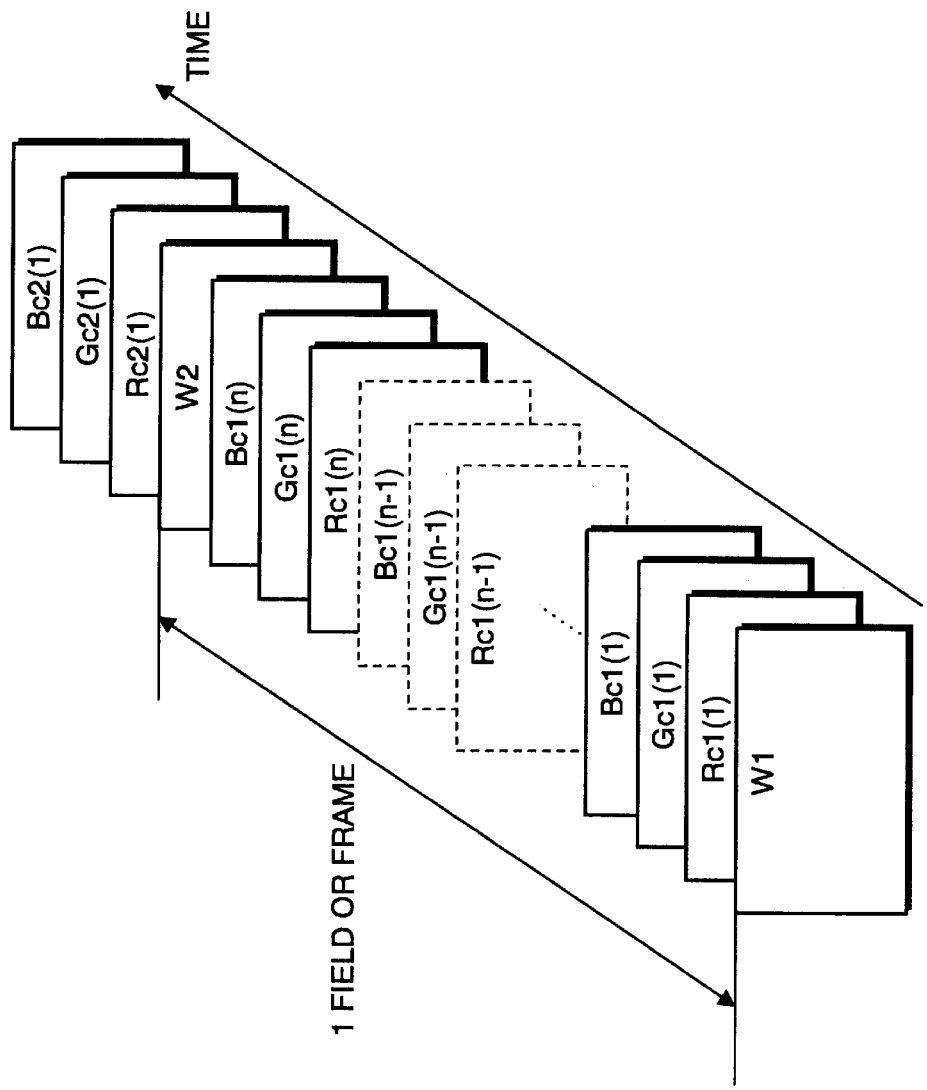
FIG. 15 illustrates the sequence of monochromatic images displayed in the third embodiment.

FIG. 15 illustrates the overall operation of the third embodiment. In the first field or frame, for example, a white monochromatic image W1 is displayed, followed by red monochromatic images Rc1(1) to Rc1(n), green monochromatic images Gc1(1) to Gc1(n), and blue monochromatic images Bc1 (1)to Bc1(n). The red, green, and blue monochromatic images are displayed in the sequence Rc1(1), Gc1(1), Bc1(1), Rc1(2), and so on, cycling among the colors red, green, and blue.

Figure 16:
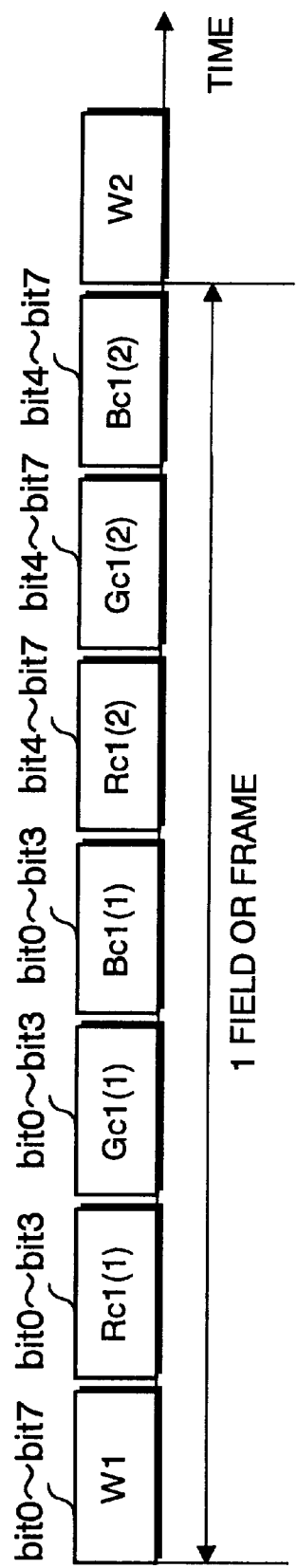
FIG. 16 illustrates the corresponding monochromatic image data sequence.

As described in the first embodiment, the luminance data decomposer 10 can divide each of the received component values Rc, Gc, Bc by n, or can decompose these values into groups of bits. FIG. 16 illustrates the case in which the achromatic component separator 6 outputs eight-bit data for each of the components W, Rc, Gc, Bc, and the luminance data decomposer 10 divides the eight-bit data of the red, green, and blue components into a lower four-bit group (bits 0 to 3) and an upper four-bit group (bits 4 to 7), generating two monochromatic images per field or frame in each primary color (n=2).

Figure 17:
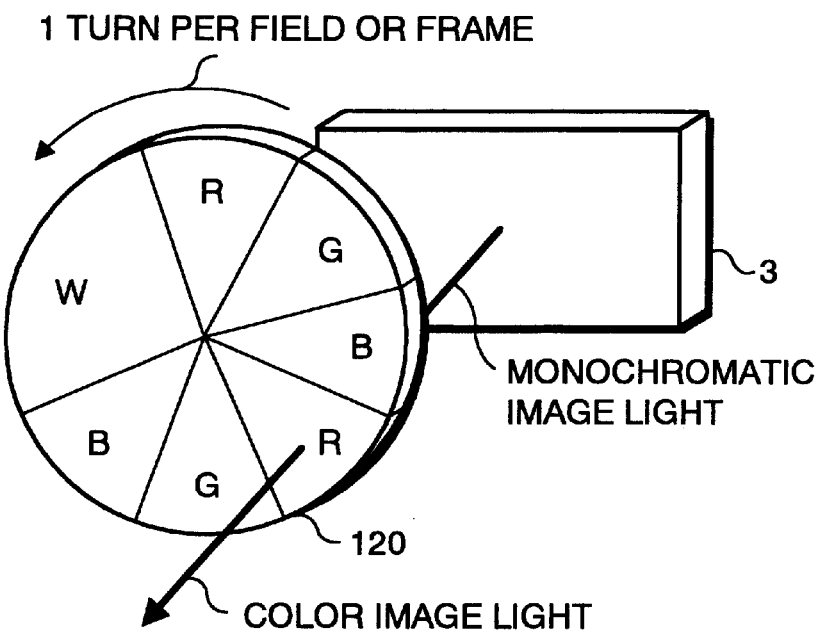
FIG. 17 shows an exemplary configuration of the colorizing device in the third embodiment.
Figure 18:
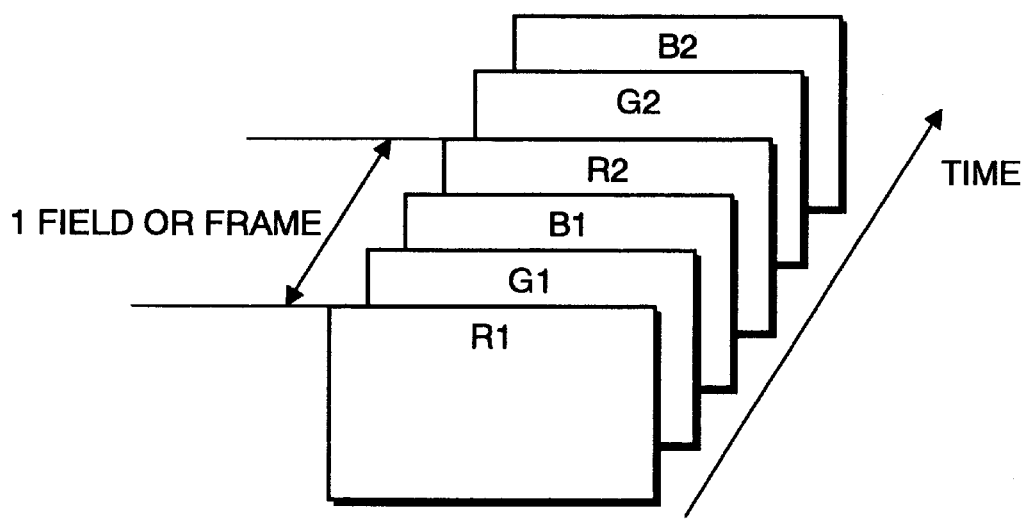
FIG. 18 illustrates the sequence of images displayed by a conventional field-sequential color image display apparatus.

Referring to FIG. 17, the colorizing device 12 comprises, for example, a color filter wheel 120 with one colorless or white sector (W) and n sectors of each of the three primary colors (R, G, B). In FIG. 17, n is equal to two and the color filter wheel 120 has seven segments, arranged in the sequence white, red, green, blue, red, green, blue. The color filter wheel 120 makes one revolution per field or frame. The angles subtended by the sectors are proportional to the durations of the corresponding monochromatic images, and are not drawn to scale in FIG. 17.

Instead of operating as indicated in FIG. 16, the luminance data decomposer 10 may divide the data into odd-numbered bits and even-numbered bits, into a most significant bit and other bits, or into individual bits, as described in the first embodiment. Corresponding modifications can be made in the color filter wheel shown in FIG. 17.

The monochromatic image display device 3 in the embodiments described above may be any type of display device that can be driven by high-speed pulse-width modulation. Examples include ferroelectric liquid crystal (FLC) panels, light-emitting diode (LED) panels, field-emission display (FED) devices, and microelectromechanical devices such as the digital micromirror device (DMD).

The colorizing device is not limited to the use of a color filter wheel; liquid crystal color shutters or other devices with switchable transmission spectra can be employed. Alternatively, the colorizing device may comprise light sources of the three primary colors. Light-emitting diodes, semiconductor lasers, lamps, and other colored light sources can be used.

The invention as described above has the following effects.

Decomposing each of the three primary-color images in one field or frame into n monochromatic images, which are displayed in a cyclic red-green-blue sequence, reduces color breakup by shortening the intervals at which different-colored images are displayed. This effect is obtained regardless of whether the n monochromatic images are of equal or unequal duration.

Bit-wise decomposition of the image data enables the decomposition to be carried out by simple bit operations, without requiring arithmetic operations such as division. Among the bit-decomposition schemes shown in the embodiments, decomposition into equal numbers of low-order and high-order bits has the advantage of simplicity, and of producing equal amounts of data for each monochromatic image. Decomposing the data into even and odd bits retains the advantage of equal amounts of data, while producing images of more nearly equal duration. Decomposing the data by splitting off the most significant bit produces two monochromatic images of nearly equal duration. Creating a separate monochromatic image for each bit produces the maximum number of monochromatic images.

Decomposing the red-green-blue image data into an achromatic or white component and remaining chromatic components reduces the number of images that need to be displayed per field or frame. If the input image is white, then the displayed image is completely free of color breakup. If the input image is a color image, color breakup is reduced because the duration and intensity of the color monochromatic images is reduced.

A few variations of the embodiments have been mentioned above, but those skilled in the art will recognize that further variations are possible within the scope claimed below.

What is claimed is:

1. A field-sequential color image display device for displaying a color image by sequentially displaying monochromatic images of different colors, comprising:

a data decomposing means receiving image data for three primary-color components of one full-color image, including one red component, one green component, and one blue component, and decomposing the received image data to generate one white monochromatic image, at least one red monochromatic image, at least one green monochromatic image, and at least one blue monochromatic image; and a display means coupled to said data decomposing means, displaying the monochromatic images generated by said data decomposing means sequentially, in a predetermined order.

2. The field-sequential color image display device of claim 1, wherein said display means comprises:

a monochromatic display device displaying said white monochromatic image, said red monochromatic image, said green monochromatic image, and said blue monochromatic image as white displayed images; and a colorizing device converting the white displayed images representing said red monochromatic image, said green monochromatic image, and said blue monochromatic image to a red displayed image, a green displayed image, and a blue displayed image, respectively.

3. The field-sequential color image display device of claims 1, wherein said data decomposing means comprises an achromatic component separating means generating one said white monochromatic image, one said red monochromatic image, one said green monochromatic image, and one said blue monochromatic image.

4. The field-sequential color image display device of claim 3, wherein said data decomposing means further comprises a luminance data decomposer generating a plurality of red monochromatic images from said one red monochromatic image, a plurality of green monochromatic images from said one green monochromatic image, and a plurality of blue monochromatic images from said one blue monochromatic image, said display means displaying the red, green, and blue monochromatic images generated by said luminance data decomposer.

5. A method of displaying a color image by displaying successive monochromatic images in different primary colors, said method comprising:

receiving an image data corresponding to a full-color image, said image data containing information about plural picture elements, the information being an M-bit integer per picture element, the signal also containing information about three different primary color components of the full-color image;

decomposing said image data to generate plural monochromatic images including N first primary color monochromatic images, N second primary color monochromatic images, and N third primary color monochromatic images, said first and second and third primary colors being different, N being an integer greater than one but not greater than M, said decomposing including dividing said M bits per picture element for each primary color component into N groups of bits, said dividing depending on the bits forming each individual M bits; and displaying said plural monochromatic images in sequence.

6. The method of claim 5, wherein said first primary color is red, said second primary color is green, and said third primary color is blue.

7. The method of claim 5, wherein said dividing includes dividing said each individual M bits into N groups of bits in ascending order of significance.

8. The method of claim 5, wherein said integer N is equal to 2 and said integer M is greater than N, and said dividing includes dividing said each individual M bits into even and odd bits.

9. The method of claim 5, wherein said integer N is greater than 2 and said integer M is greater than N, and said dividing includes dividing said each individual M bits into a group of most significant bits and a group of least significant bits.

10. A method of displaying a color image by displaying successive monochromatic images in different colors, comprising the steps of:

receiving image data for three primary-color components of one full-color image, including one first primary component, one second primary component, and one third primary component;

decomposing said image data to generate more than three monochromatic images, wherein said monochromatic images include one white monochromatic image, one first primary component monochromatic image, one second primary component monochromatic image, and one third primary component monochromatic image; and displaying said generated monochromatic images sequentially.

11. The method of claim 10, wherein said monochromatic images include one white monochromatic image, one red monochromatic image, one green monochromatic image, and one blue monochromatic image.

12. The method of claim 11, wherein said monochromatic images include one white image, N red monochromatic images, N green monochromatic images, and N blue monochromatic images, N being an integer greater than one.

13. A field-sequential color image display device for displaying a color image by sequentially displaying monochromatic images of primary colors, said image display device comprising:

an input receiving an image data corresponding to a full-color image, said image data containing information about plural picture elements, the information being an M-bit integer per picture element, the signal also containing information about three different primary color components of the full-color image;

a processor operatively coupled to said input, said processor decomposing said image data to generate plural monochromatic images including N first primary color monochromatic images, N second primary color monochromatic images, and N third primary color monochromatic images, said first and second and third primary colors being different, N being an integer greater than one but not greater than M, said processor dividing said M bits per picture element for each primary color component into N groups of bits, said dividing depending on the bits forming each individual M bits; and a display component operatively coupled to said processor, said display component displaying said plural monochromatic images in sequence.

14. The image display device according to claim 13, wherein said first primary color is red, said second primary color is green, and said third primary color is blue.

15. The field-sequential color image display device of claim 14, wherein said display component includes:

a monochromatic display device displaying said red monochromatic images, said green monochromatic images, and said blue monochromatic images as white images; and a colorizing device converting said white images to red displayed images, green displayed images, and blue displayed images in said predetermined order.

16. The field-sequential color image display device of claim 15, wherein said colorizing device includes a color filter wheel.

17. The image display device according to claim 13, wherein said processor divides said each individual M bits into N groups of bits in ascending order of significance.

18. The image display device according to claim 13, wherein said integer N is equal to 2 and said integer M is greater than N, and said processor divides said each individual M bits into even and odd bits.

19. The image display device according to claim 13, wherein said integer N is greater than 2 and said integer M is greater than N, and said processor divides said each individual M bits into a group of most significant bits and a group of least significant bits.

20. A field-sequential color image display device for displaying a color image by sequentially displaying monochromatic images of primary colors, said image display device comprising:

an input receiving image data for three primary-color components of one full-color image, including one first primary component, one second primary component, and one third primary component;

a processor operatively coupled to said input, said processor decomposing said image data to generate more than three monochromatic images, wherein said mono chromatic images include one white monochromatic image, one first primary component monochromatic image, one second primary component monochromatic image, and one third primary component monochromatic image; and a display component operatively coupled to said processor, said display component displaying said generated monochromatic images sequentially.

21. The image display device according to claim 20, wherein said monochromatic images generated by said processor include one white monochromatic image, one red monochromatic image, one green monochromatic image, and one blue monochromatic image.

22. The image display device according to claim 21, wherein said monochromatic images generated by said processor include one white image, N red monochromatic images, N green monochromatic images, and N blue monochromatic images, N being an integer greater than one.

* * * * *